June 2, 1970 — R. S. COURVILLE — 3,515,372
WINGED LOGGING WEDGE
Filed May 9, 1969
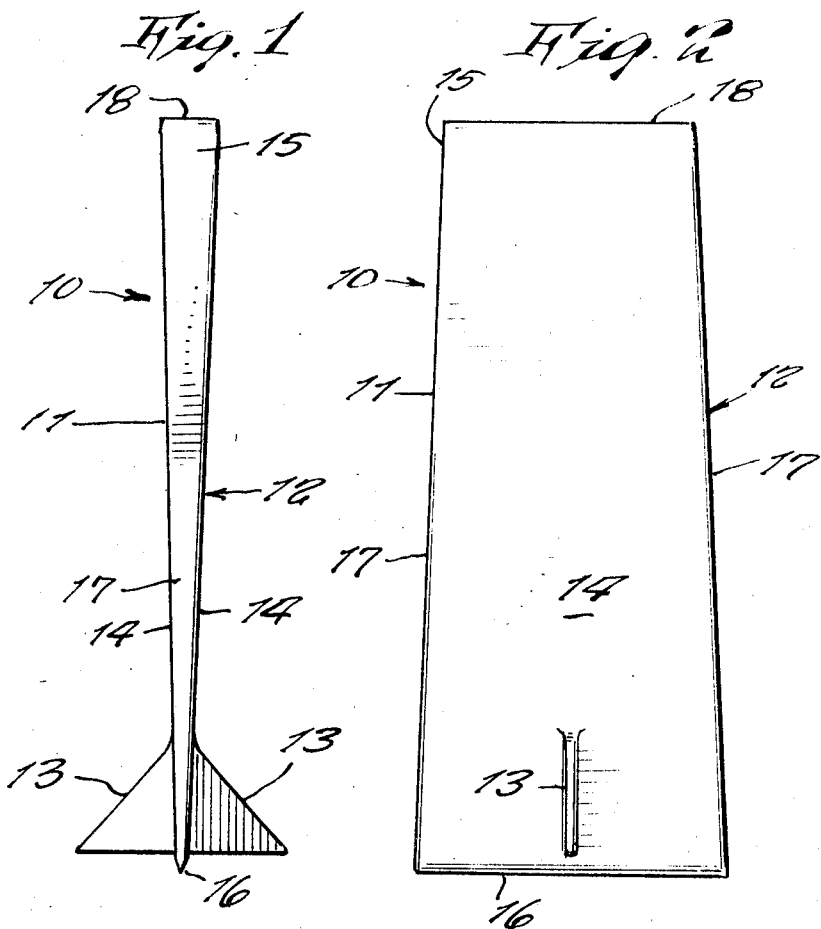
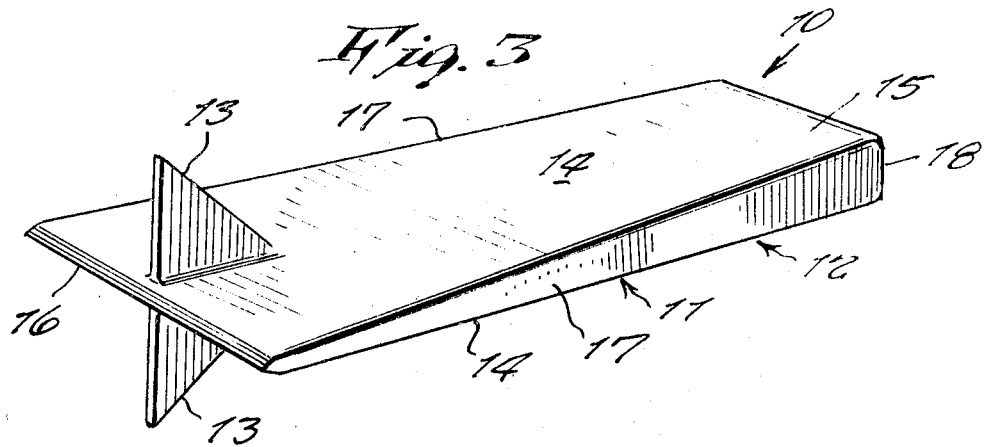
INVENTOR
R. S. COURVILLE

United States Patent Office 3,515,372
Patented June 2, 1970

---

3,515,372
WINGED LOGGING WEDGE
Rudolph S. Courville, P.O. Box 54,
Nespelem, Wash. 99155
Filed May 9, 1969, Ser. No. 823,386
Int. Cl. B27g 19/08
U.S. Cl. 254—104                 1 Claim

ABSTRACT OF THE DISCLOSURE

A wedge for use in cutting up trees, the wedge comprising a conventional configurated wedge member which furthermore includes a fin or wing on each opposite flat side of the wedge, each wing being relatively close to the wedge narrow end and each wing extending perpendicularly to the flat side of the wedge to which it is affixed.

---

This invention relates generally to logging wedges.

A principal object of the present invention is to provide a winged logging wedge for use in cutting trees into logs, and to prevent the trees from pinching a saw.

Another object of the present invention is to provide a winged logging wedge wherein the wedge includes a pair of wings extending transversely from each side of the wedge, the wings serving to keep the log from rolling into a twist, as the wedge is driven into the saw cut, thus permitting the log to be cut completely therethrough without the danger of ruining a cutting chain.

Yet another object of the present invention is to provide a winged logging wedge which will eliminate the necessity for cutting from a bottom upwardly in cutting a tree, such upwardly cutting being somewhat dangerous and being hard on saws.

Yet a further object is to provide a winged logging wedge which will eliminate the necessity for a logger to carry an axe to drive crossways of his saw cut to keep logs from twisting.

Yet a further object of the present invention is to provide a winged logging wedge which besides eliminating the danger of ruining a costly power saw, will also speed up log production.

Other objects of the present invention are to provide a winged logging wedge which is simple in design, inexpensive to manufacture, rugged in construction, easy to use and efficient in operation.

These and other objects will become readily evident upon a study of the following specification and the accompanying drawing wherein:

FIG. 1 is a side edge elevation view of the present invention,

FIG. 2 is a flat side elevation view of the present invention, and

FIG. 3 is a perspective view thereof.

Referring now to the drawing in greater detail, the reference numeral 10 represents a winged logging wedge according to the present invention, wherein there is a one-piece member 11 which is comprised of an ordinary wedge body 12 and a plurality of integral wings 13.

The wedge body 12 comprises a generally flat member having flat opposite sides 14, one end of the wedge body being relatively thick in thickness, as shown at 15, the opposite end of the wedge body being tapered toward a chisel edge 16. The opposite sides 14 are bounded by side edges 17 parallel to each other or slightly tapered relative to each other, as indicated in FIG. 2 of the drawing.

The blunt end of the wedge body that is opposite the chisel edge 16 is defined by the reference numeral 18. This blunt edge is used for being engaged by a sledge hammer or the like.

Each of the wings 13 comprises a triangular configurated fin that is integrally formed upon each flat side 14, the wing 13 being located relatively close to the chisel edge 16, and each wing 13 extending perpendicularly respective to the flat side 14 so that the plane of the wing is perpendicular to the plane of the side 14.

As shown in FIG. 3, the wings 13 are parallel to each other on opposite sides of the wedge body.

The wings may be formed upon the chisel body either by a forging operation or may be rigidly affixed thereto by a welding operation, as preferred by a manufacture for producing a winged logging wedge of relatively great strength and durability.

In operative use, the winged logging wedge is used in cutting trees into logs and preventing the wedge from pinching a saw. The wing on each side of the wedge is driven into the saw cut, the wings keeping the log from rolling into a twist, thus permitting a log to be cut completely therethrough without the danger of ruining a cutting chain. It will also eliminate the need for cutting from the bottom upwardly which in itself is a little dangerous and hard on saws.

The logger will not accordingly have to carry an axe so to drive crossways of his saw cut so to keep logs from twisting.

It is to be understood that the particular shape of the wings may be modified so to extend a relatively greater length across each flat side 14 of the wedge if the same may afford a greater strength and durability. Accordingly, the particular shape of each wing may be modified so to be triangular, have an arcuate edge, or have trailing choir ends, according to the desire of the manufacturer.

What I now claim is:

1. In a winged logging wedge, the combination of a unitary assembly, said unitary assembly comprising a wedge body, said wedge body including a plurality of wings so to keep a log from rolling into a twist and permitting a log to be cut completely therethrough without the danger of ruining a cutting chain, said wedge body comprising an element having converging opposite flat sides, one end of said wedge body being of relatively greater thickness than the opposite end thereof being relatively narrowed, said end of said wedge body of greater thickness having a blunt end adaptable for receiving hammer blows, and said opposite end of said wedge body having a chisel edge, said plurality of wings comprising a pair of fin configurated elements, each one of said fin elements being integral with each one of said flat sides of said wedge body, each said wing extending perpendicular to said wedge body, and said wedge wings being aligned in a plane relative to each other, each of said wings being of generally triangular configuration, each said wing having a straight leading edge that is transversely parallel to said chisel edge.

References Cited

UNITED STATES PATENTS

| | | | |
|---|---|---|---|
| 759,868 | 5/1904 | Eich | 254—104 |
| 1,192,185 | 7/1916 | Gravel | 254—104 |
| 1,261,834 | 4/1918 | Manning | 254—104 |

DONALD R. SCHRAN, Primary Examiner

U.S. Cl. X.R.

144—193